(12) United States Patent
Rozycki

(10) Patent No.: US 7,645,346 B2
(45) Date of Patent: Jan. 12, 2010

(54) PIPELINE CLEANING APPARATUS

(75) Inventor: Richard Raymond Rozycki, Woodhaven, MI (US)

(73) Assignee: Inland Waters Pollution Control, Inc., Detroit, MI (US)

( * ) Notice: Subject to any disclaimer, the term of this patent is extended or adjusted under 35 U.S.C. 154(b) by 711 days.

(21) Appl. No.: 11/339,529

(22) Filed: Jan. 26, 2006

(65) Prior Publication Data

US 2006/0191559 A1 Aug. 31, 2006

Related U.S. Application Data

(60) Provisional application No. 60/646,993, filed on Jan. 27, 2005.

(51) Int. Cl.
*B08B 9/055* (2006.01)

(52) U.S. Cl. .................. 134/166 C; 15/3.5; 15/104.061

(58) Field of Classification Search ........................ None
See application file for complete search history.

(56) References Cited

U.S. PATENT DOCUMENTS

| | | | |
|---|---|---|---|
| 2,508,659 A | | 5/1950 | Brown |
| 3,056,156 A | | 10/1962 | Immel |
| 4,281,995 A | * | 8/1981 | Pansini ........................ 440/38 |
| 4,364,141 A | * | 12/1982 | Crane .................... 15/104.061 |
| 4,780,072 A | * | 10/1988 | Burnette ...................... 425/62 |
| 4,957,123 A | | 9/1990 | McHugh |
| 5,287,133 A | * | 2/1994 | Bohley ........................ 396/196 |
| 5,336,333 A | | 8/1994 | Sheppard et al. |
| 5,341,539 A | | 8/1994 | Sheppard et al. |
| 5,580,393 A | * | 12/1996 | Lawther ........................ 134/8 |
| 6,508,261 B1 | | 1/2003 | Nezat, II |
| 7,267,133 B1 | * | 9/2007 | Nezat, II .................. 134/166 C |

FOREIGN PATENT DOCUMENTS

| | | |
|---|---|---|
| DE | 225 176 C | 6/1909 |
| DE | 35 07 855 A1 | 11/1985 |
| FR | 2792015 A | 10/2000 |
| WO | PCT/US2006/002484 | 2/2008 |

\* cited by examiner

*Primary Examiner*—Michael Kornakov
*Assistant Examiner*—Ryan Coleman
(74) *Attorney, Agent, or Firm*—Hahn & Voight PLLC; Frederick F. Calvetti

(57) ABSTRACT

A cleaning apparatus useful for cleaning the interior of a pipeline contains: (A) a platform of a dimension sufficient to be inserted through an opening in the pipeline, the platform containing one or more portions; (B) a fluid interrupter having one or more parts to provide a surface to contact fluid flow and thereby interrupt fluid flow, the fluid interrupter constructed and arranged to be attached to the platform; a downstream side of the fluid interrupter being supported by members connected to the platform to dispose the fluid interrupter against fluid flow; (C) runners attached to the underside of the platform to contact an inner diameter of the pipeline; whereby the supported fluid interrupter, platform and runners redirect fluid flow between an underside of the platform and an inner surface of the pipeline; and (D) a device located downstream of the fluid interrupter to constrict the volume of the redirected fluid and increase its flow rate; whereby fluid flow is increased to move solid waste in the pipeline; and method for utilization of the cleaning apparatus to assist in relocation of solids in a pipeline for extraction therefrom, such as sewer lines or storm drains. The apparatus may further have opposing support members on an upper face of the platform; a rudder to orient disposition of the apparatus; one or more ballasts to correct any listing of the apparatus during use; and/or one or more seals or skirts that help the sled better form to the pipe.

13 Claims, 8 Drawing Sheets

PIPELINE CLEANING APPARATUS

This application is based on and claims priority to U.S. Provisional Application No. 60/646,993, filed Jan. 27, 2005, which is incorporated by reference herein.

BACKGROUND OF THE INVENTION

This invention relates to apparatuses and methods for cleaning pipelines, e.g., sewers, storm drains, and the like. More particularly, this invention relates to a pipe-cleaning apparatus to be assembled on site for use in large pipelines typically associated with municipal sewage lines or storm drains, including those disposed along highways. The invention further relates to a method of using such apparatus for moving solids settled in the pipeline to a location from which it can be removed.

SUMMARY OF THE INVENTION

A first embodiment of a cleaning apparatus of the present invention includes:
- (A) a platform of a dimension sufficient to be inserted through an opening in a pipeline, the platform having at least one portion;
- (B) a fluid interrupter containing at least one part to provide a surface to contact fluid flow and thereby interrupt fluid flow, the fluid interrupter constructed and arranged to be attached to the platform; a downstream side of the fluid interrupter being supported by members connected to the platform to dispose the fluid interrupter against fluid flow;
- (C) runners attached to the underside of the platform to contact an inner diameter of the pipeline; whereby the supported fluid interrupter, platform and runners redirect fluid flow between an underside of the platform and an inner surface of the pipeline; and
- (D) a device located downstream of the fluid interrupter to constrict the volume of the redirected fluid and increase its flow rate; whereby fluid flow is increased to move solid waste in the pipeline.

In a second embodiment of the cleaning apparatus of the invention, the apparatus further includes opposing support members on an upper face of the platform.

In a further embodiment of the apparatus of the invention, the apparatus contains:
- (A) a platform of a dimension to be inserted through an opening in a pipeline, the platform comprising a unitary construction;
- (B) attached to the upstream side of the unitary platform is a fluid interrupter; the fluid interrupter having multiple substantially parallel tubes attached to each other to form a surface upon which contacts the flow of fluid through the pipeline; the dimensions of the surface of the fluid interrupter being less than the diameter of the pipeline; the surface of the fluid interrupter being supported by members attached to it and the platform; the platform being displaced from the interior surface of the pipeline by runners; the platform, fluid interrupter, supports and runners forming a sled movable in the pipeline; the fluid interrupter being disposed to redirect fluid beneath the platform; the platform, runners and interior surface of the pipeline constricting movement of redirected fluid;
- (C) a gate located downstream of the fluid interrupter to increase flow rate to a rate of flow adequate to move solids in the pipeline; and
- (D) a bypass device attached to the sled to control back pressure from constricted fluid and avoid upward movement of a downstream portion of the sled.

The apparatuses of the present invention optionally include a rudder to orient disposition of the apparatus; one or more ballasts to correct any listing of the apparatus during use; and/or one or more seals or skirts that help the sled better form to the pipe.

One embodiment of the method of this invention involves:
- (1) locating a cleaning apparatus in the interior of the pipeline to move the solids in a direction of fluid flow, thereby interrupting a portion of the fluid flow to redirect the flow to a lower part of the apparatus;
- (2) constricting the fluid flow to increase rate of the fluid flow between the apparatus and the pipeline by reducing the volume through which interrupted fluid flows;
- (3) utilizing flow of uninterrupted fluid in said pipeline to assist in moving the cleaning apparatus in the direction of fluid flow; and
- (4) utilizing the increased flow rate of constricted fluid of step (2) to move the solids in the direction of fluid flow.

A second embodiment of the method of this invention involves:
- (1) inserting a cleaning apparatus into the interior of the pipeline to move solids in a direction of fluid flow, the cleaning apparatus being constructed and arranged to interrupt a portion of fluid flow in the pipeline and to redirect fluid flow between a lower part of the cleaning apparatus and the interior of the pipeline; the pipeline having a diameter sufficient to permit construction and arrangement of the cleaning apparatus in the pipeline and to interrupt fluid flow; the fluid flow rate in the pipeline being sufficient to develop a rate of flow causing said solids to move downstream of the cleaning apparatus;
- (2) increasing the fluid flow rate beneath the cleaning apparatus by constricting the volume through which the fluid flows;
- (3) utilizing a gate at or near a distal end of the cleaning apparatus to increase flow rate to move the solids downstream;
- (4) bypassing fluid to above the constricted volume to avoid movement of the cleaning apparatus upwardly; and
- (5) controlling movement of the cleaning apparatus and extracting collected solids from the pipeline.

DETAILED DESCRIPTION OF THE INVENTION

Figure 1:
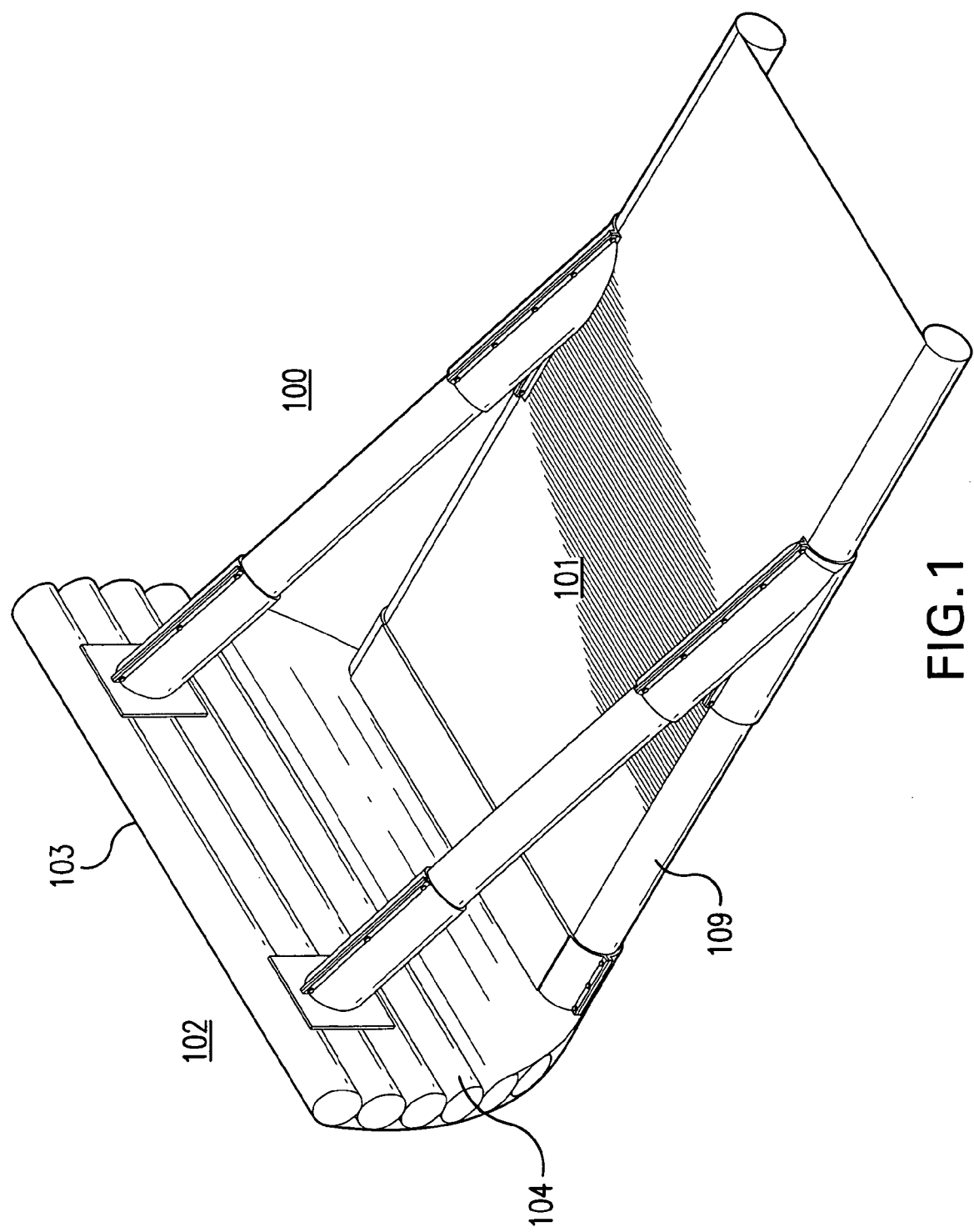
FIG. 1 is a perspective view of a first embodiment of a cleaning apparatus within the scope of the present invention.
Figure 2:
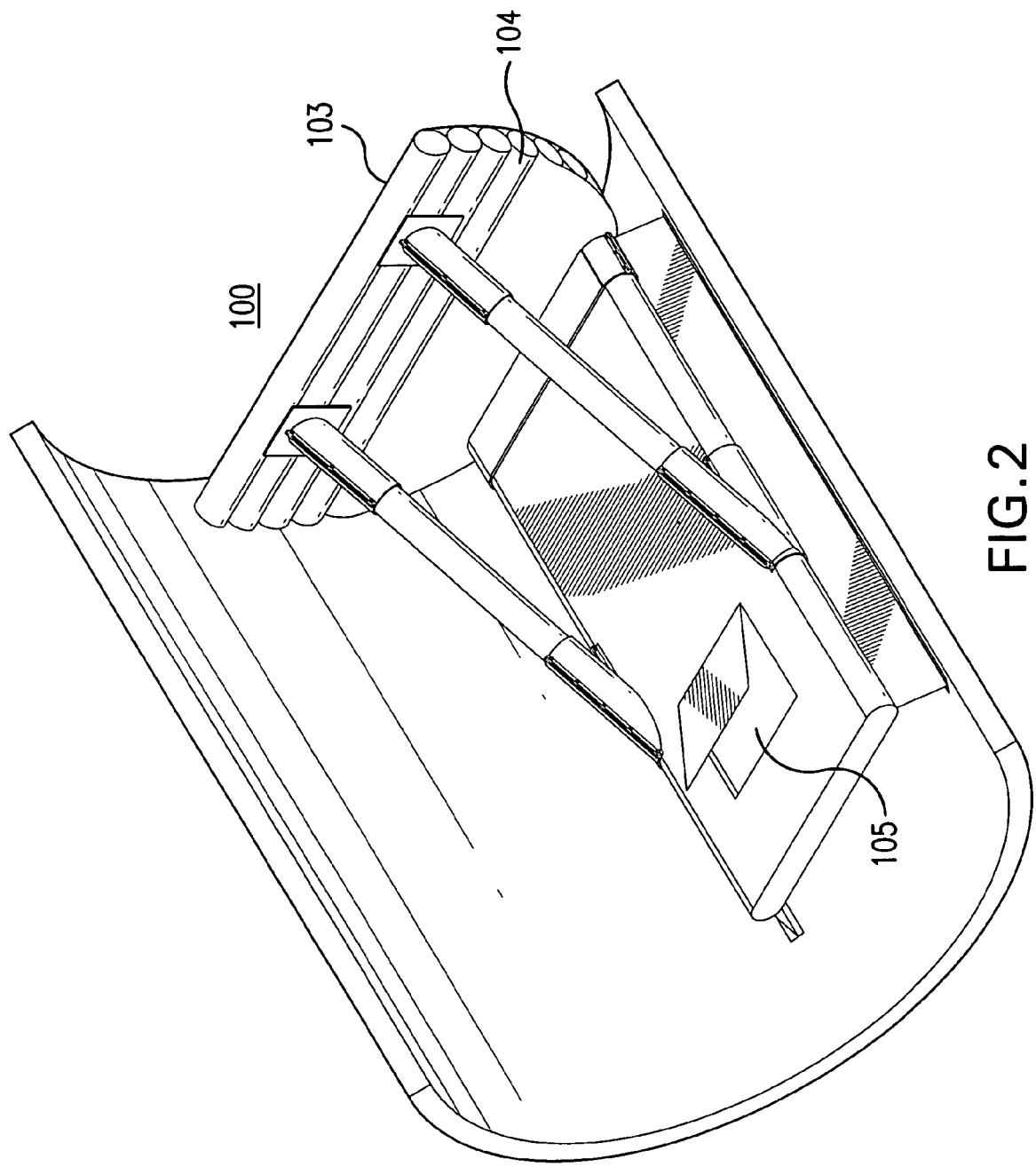
FIG. 2 is a second perspective view of the cleaning apparatus shown in FIG. 1.

The present invention provides a cleaning apparatus and method of using same to clean pipelines, preferably large pipelines. The term "large pipelines" as used herein refers to pipeline or pipelines which can permit assembly of the apparatus and which has a sufficient fluid flow to permit the apparatus to permit cleaning or movement of solids forward in the direction of fluid flow. The apparatus and method of this invention are particularly suitable for use in sewers and storm drains.

The cleaning apparatus and method of this invention are described with the aid of FIGS. 1-7, which are not limiting of the invention.

FIGS. 1, 2 and 5-7 show a first embodiment of the cleaning apparatus of this invention. The apparatus is in the form of a sled 100. Sled 100 has a platform 101 with an interrupter device 102 having an interrupter surface 103. Interrupter device 102 comprises one or more members 104 which are connected together by conventional physical means such as nuts and bolts (not shown). The dimensions of individual bolts can be 2-3 inches. The bolts are typically formed of stainless steel or brass to avoid corrosion. Members 104 can be tubes, beams or similar structures which can be assembled on site. The size and dimension of these members are determined as a matter of convenience to transport them to the site for cleaning, that is, inside the pipeline. Members 104 are typically impervious or have a continuous solid surface for structural integrity but can be perforated.

Preferably, interrupter 102 is assembled on site and attached to platform 101. Platform 101 can be a unitary construction comprised of a single or multiple pieces. The materials of construction are determined by the characteristics of the fluid and the force or head developed by the flow of water constricted. Platform 101 can contain a bypass device 105 (see FIG. 2) to assist in controlling the disposition and flow rate of fluid or liquid under the platform 101 of the sled. The sled optionally includes a gate 106 located downstream of the interrupter device. Gate 106 is of conventional design to restrict flow and increase flow rate. Gate 106 rides on the platform above the surface of the conduit or pipeline. Control of the gate can be mechanical or electronic and adjusted locally or remotely.

The platform optionally contains a device 107 to orient the disposition of the sled. Device 107 can be, e.g., a rudder, which is adjustable, or other stationary devices to counteract movement of the sled such as stationary vanes. The sled can have a counterbalance 110 to assist in counteracting upward forces from fluid being constricted under the platform. Counterbalance 110 may also constitute one or more ballasts, as is known in the art. The ballasts may be disposed on each side of the platform (i.e., each balance is adjacent to one or more sides of the platform) to correct any listing that occurs as the sled travels through a pipe or other conduit. The ballast(s) can be disposed to accommodate idiosyncrasies of the fluid flow and conduit environment. Ballast(s) 110 can be disposed centrally or on the sides of the sled to facilitate denied operation of the sled.

The sled also contains members 108 which dispose the interrupter device relative to the platform. Typically, these members are struts, which dispose the interrupter device and platform at a substantially ninety degree angle to each other and relative to the interrupter device substantially vertical relative to water flow. Members 108 can be tubes or I-beams, or they can be solid or shaped as desired to provide a surface 103. Alternative supports are shown in the described FIGS. 1-4.

The sled can be supported by runners 109 which space the sled from the surface of the conduit or pipeline. The runners may be solid or perforated, and they may be attached parallel or disposed inwardly toward each other. They may also contain wheels or other devices to facilitate movement of the sled. The wheels may be free-moving or mechanized.

The underside of the platform, the runners and the adjacent surface of the pipeline form an area to constrict movement of fluid, redirected by the interrupter device 102. Fluid flow is increased at least when the restricted fluid reaches and flows under gate 106. The bypass device, either alone or in combination with the counterbalance 110, assist in stabilized operation of the sled. The angle of the interrupter device 102 can also facilitate control and act as a weir to relieve force or head from the underside of the sled. Gate 106 should be adjustable relative to the fluid environment, to move solids forward to a location from which it can be extracted.

The interrupter device 102 may also have one or more sides seals or skirts 111 that help the sled better form to the pipe. As shown in FIGS. 5-8, each of the side seals or skirts are disposed for lateral movement. The side seals or skirts are each preferably pneumatically adjustable such that each seal or skirt moves laterally from the centerline of the interrupter device. The side seal(s) or skirt(s) is preferably made of synthetic rubber.

Figure 4:
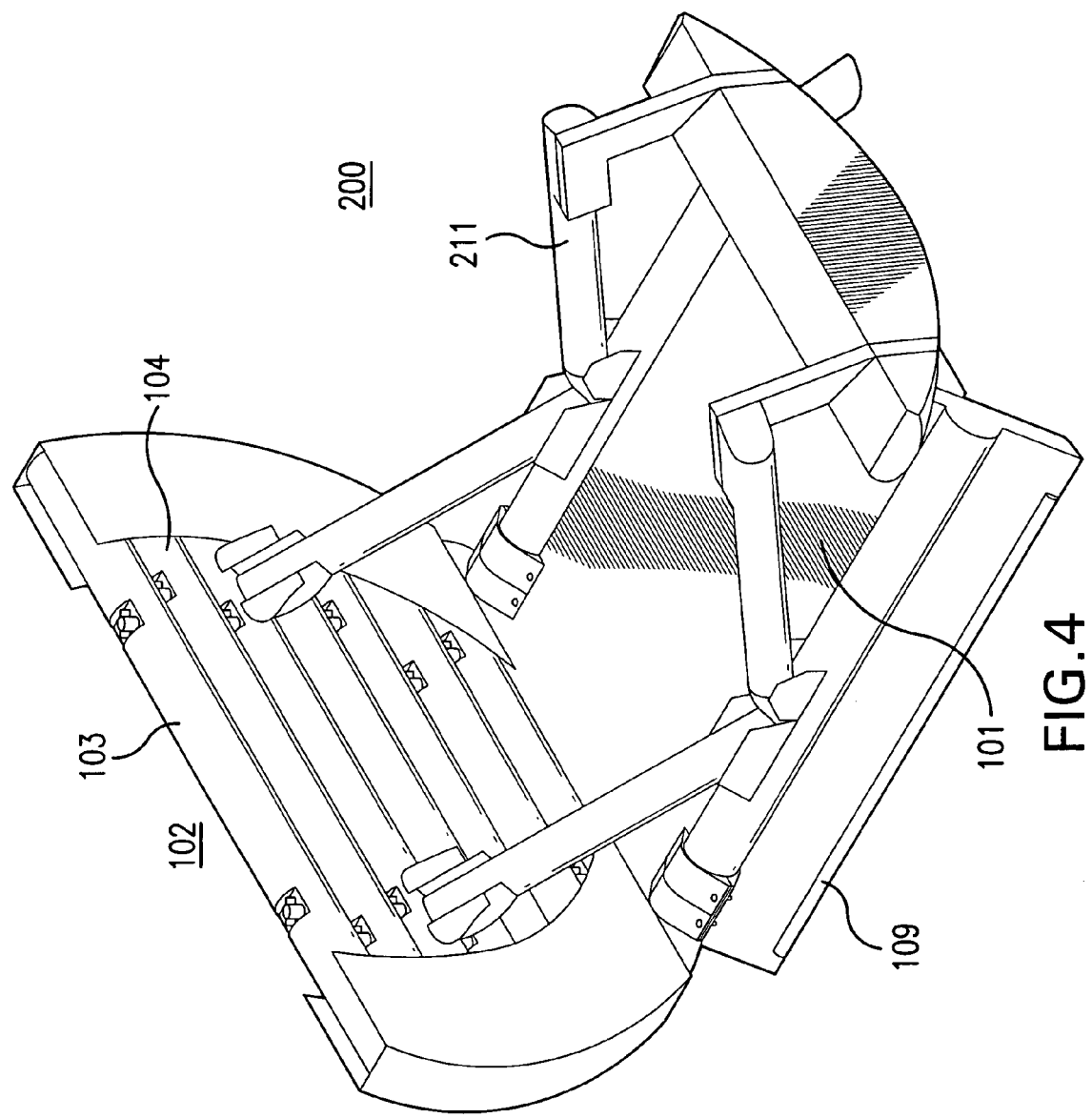
FIG. 4 is a perspective view of a second embodiment of a cleaning apparatus within the scope of the present invention.
Figure 5:
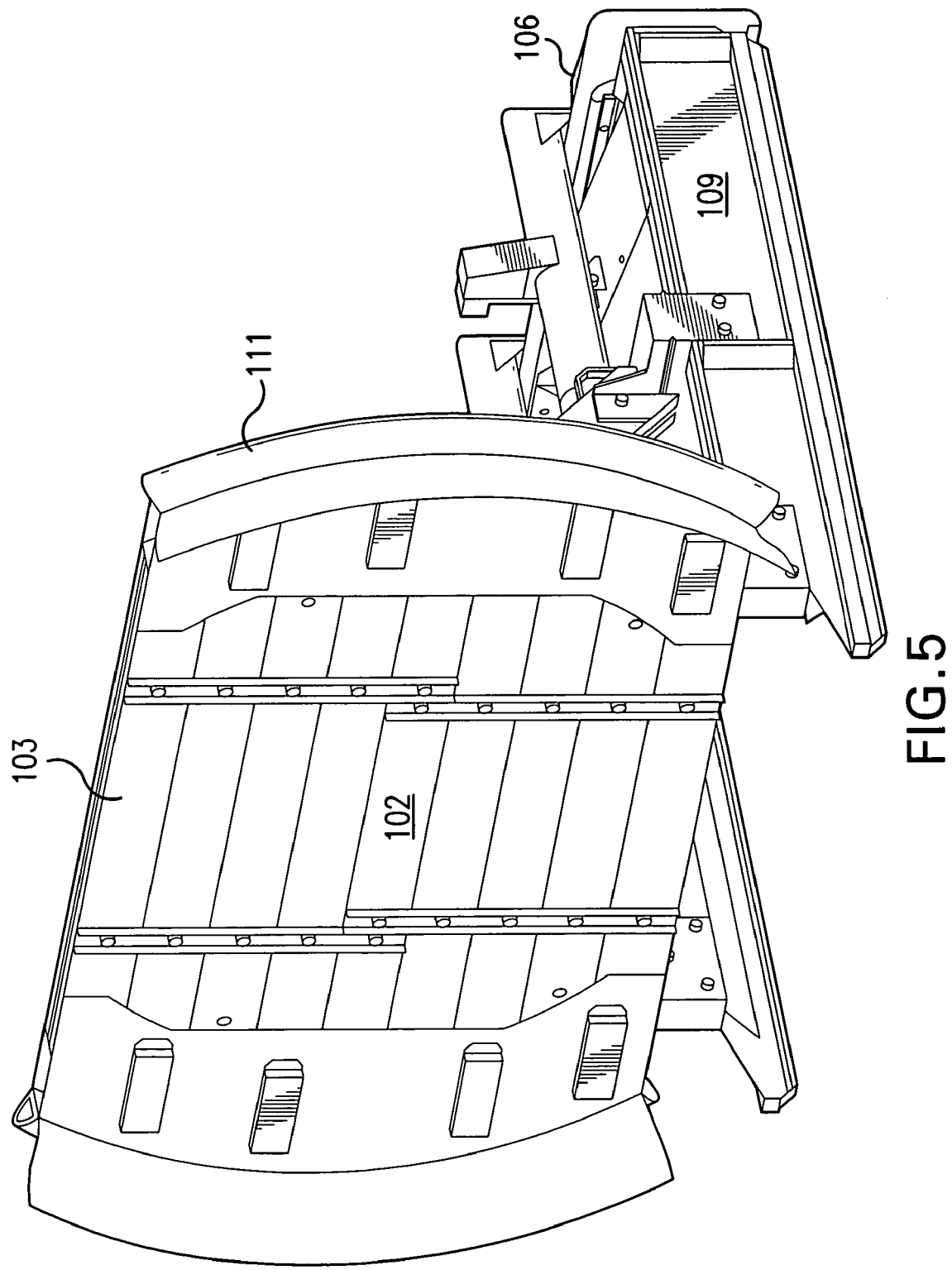
FIG. 5 is a second perspective view of the first embodiment of the cleaning apparatus within the scope of the present invention.
Figure 6:
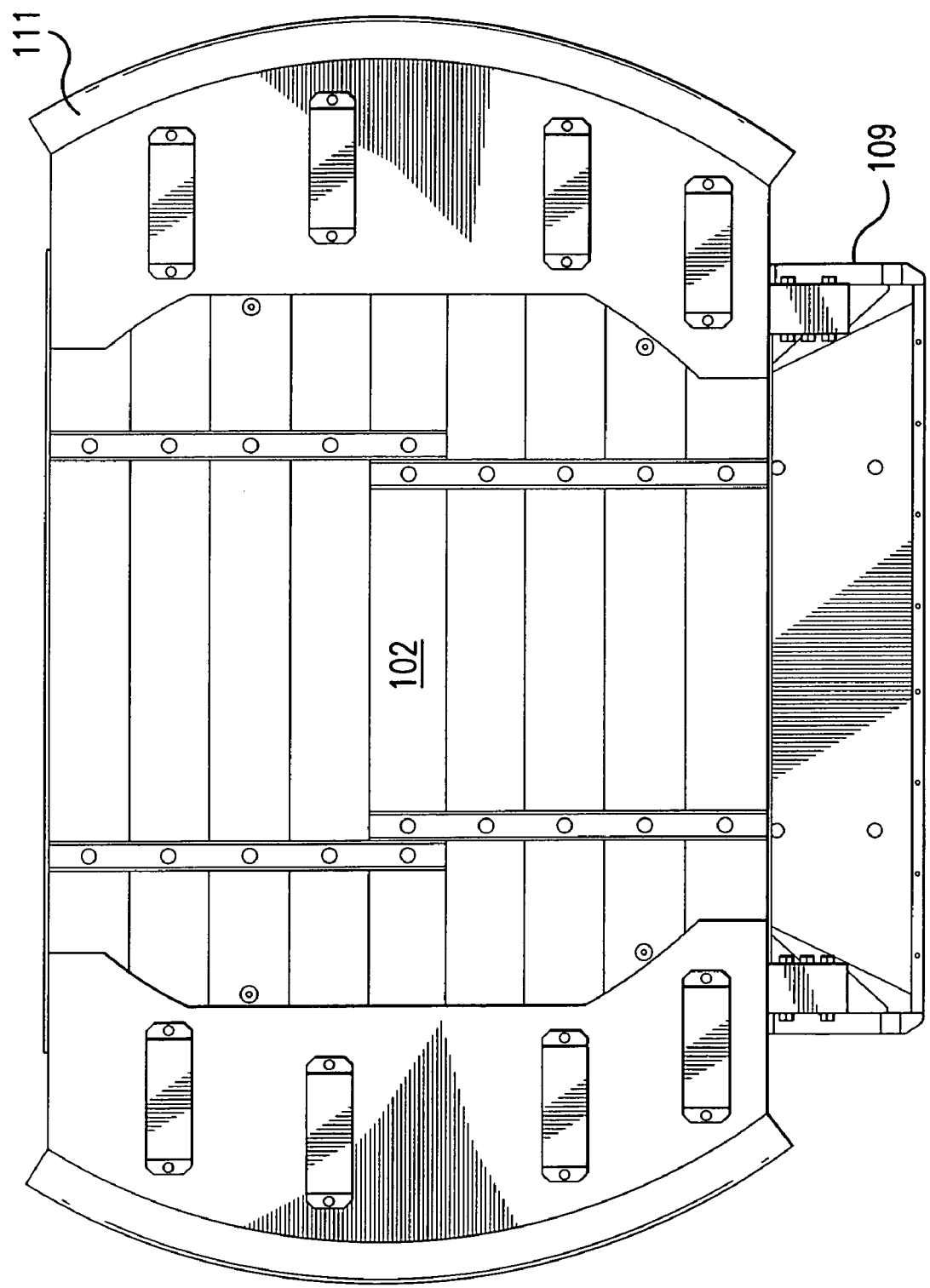
FIG. 6 is a front view of the first embodiment of the cleaning apparatus within the scope of the present invention.
Figure 7:
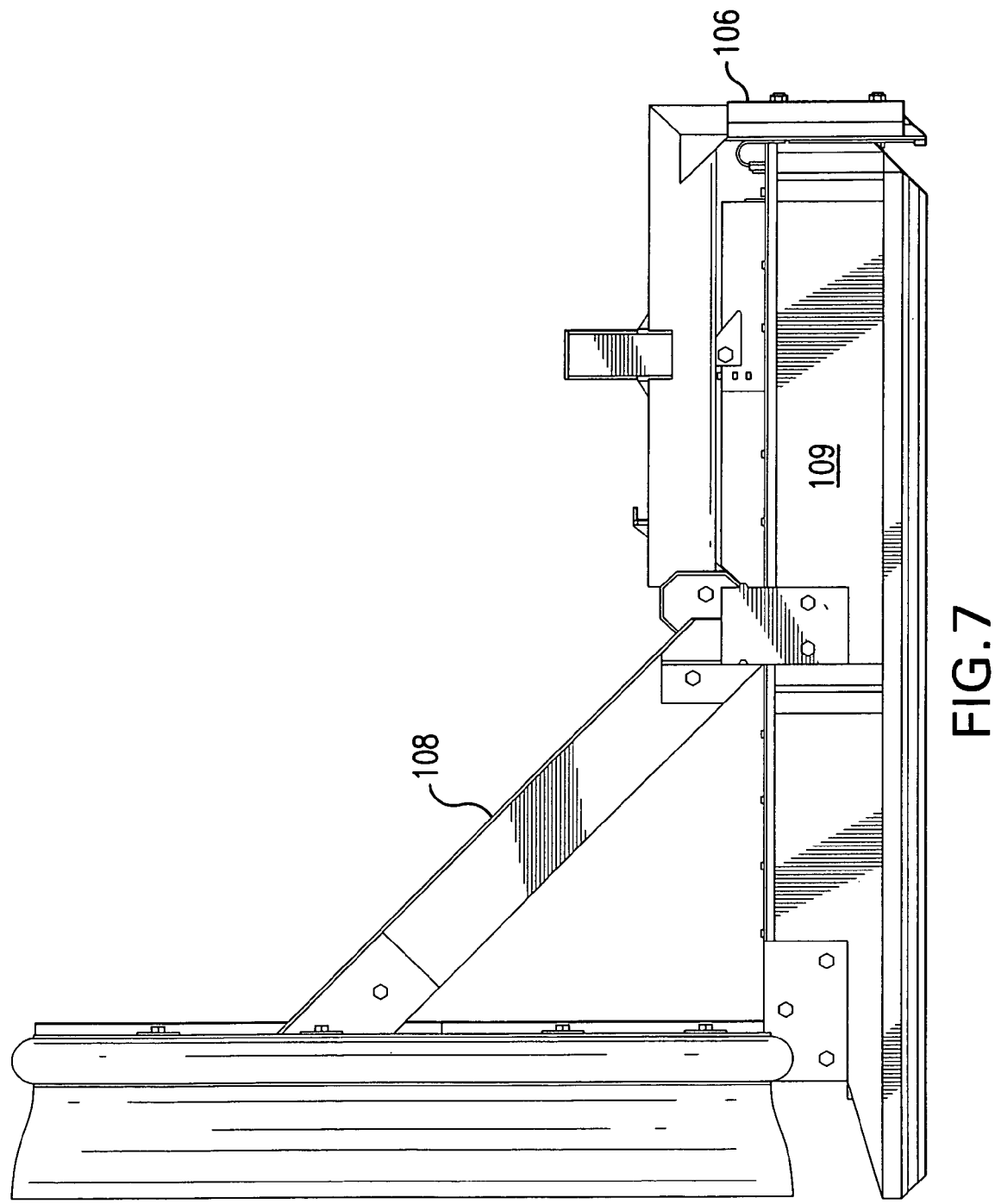
FIG. 7 is a side view of the first embodiment of the cleaning apparatus within the scope of the present invention.
Figure 8:
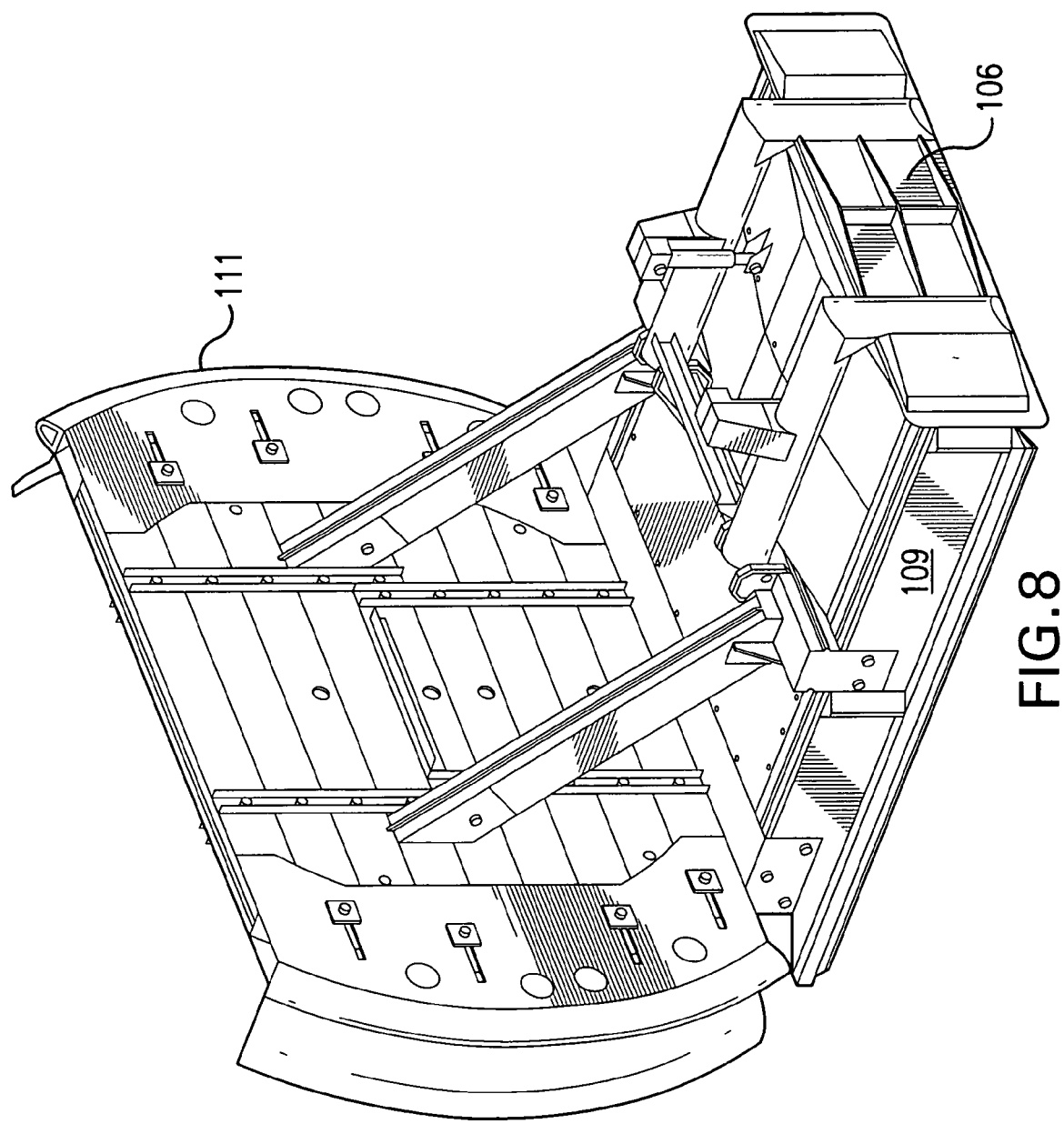
FIG. 8 is a further perspective view.

FIG. 4 shows a second embodiment of a cleaning apparatus within the scope of the invention. Sled 200 is identical to the sled 100 shown in FIG. 1 except that sled 200 further contains opposing support members 211 on an upper face of platform 201. Members 211 are preferably in the form of foldable V-shaped structures to adjust or support a gate.

Figure 3:
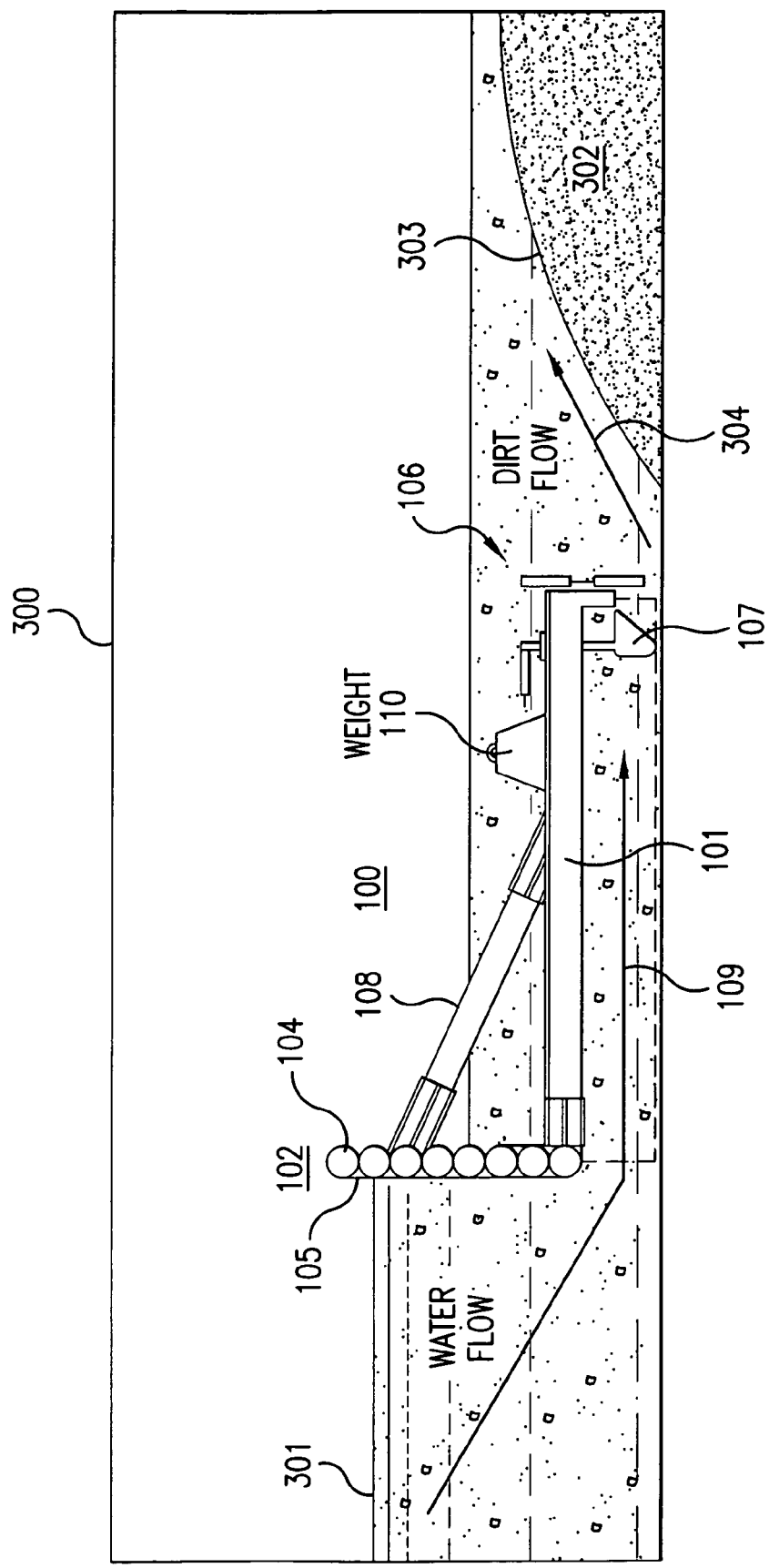
FIG. 3 is a side view of the cleaning apparatus shown in FIG. 1, wherein the cleaning apparatus is disposed in a pipeline.

FIG. 3 shows a conduit or pipeline 300 which can be cleaned using the apparatus and method of this invention. Typically, such pipeline is used in water drainage or sewage disposal systems utilized in municipalities and highway projects. The pipeline can transport raw sewage or rain water. Typically, the pipeline will have disposed therein a fluid containing water 301 and solids 302, with air flow occurring above the fluid. Examples of solids include solid wastes.

FIG. 3 further shows sled 100 disposed in pipeline 300. As sled 100 is moved downstream in the pipeline, the water portion 301 of the fluid in the pipeline is caused by the sled's configuration to flow underneath the sled and the solids portion 302 is caused to accumulate into a pile 303 in front of the sled. The direction of the solids flow is shown as arrow 304.

The invention will now be described with reference to its method of operation. The following description will not be limiting.

As shown in the schematic presentation of FIG. 3, pipeline 300 has a flow of water 301 which contains solids 302 that accumulate or settle out in the pipeline by gravity. The solids content of the water can be from a variety of sources of impurities, such as sewage or those typically found in storm drains. The solids content can be gravel, sewage, and the like. The water 301 will impact the surface of the interrupter device 102 of sled 100 to redirect water underneath the sled. The redirected water will travel under the sled, that is, under the platform 101 between runners 109 disposed on either side of the platform. The redirected water will experience a reduced volume to increase its flow rate. As this increase in flow rate commences, the water will impact gate 106 to increase flow rate so that settled solids 302 will move downstream of the sled. The sled is designed to traverse the pipeline so that the solids 302 can be relocated at a point at which solids can be extracted. The sled can be controlled locally or remotely so that it moves disposed relatively parallel to the surface of the pipeline. The constricted flow of water will have an increased head or pressure which may act upon the sled. The effect of this force or pressure can be counterbalanced through use of the bypass device 105, counterweight 110, disposition of the gate 106 or disposition and/or perforation of the interrupter device 102. The sled can also encompass rudder 107 or other similar movable or stationary devices to counterbalance the effects of increased flow rate of the water. The utilization of the gate, rudder, counterweight and interrupter device along with the bypass device would be well within the knowledge of a person skilled in the art. For example, the dimensions of the port along with the weight of the cover for the bypass device are a matter of design. The sled can be attached at a location outside the pipeline and its movement controlled or regulated therefrom. Similarly, the gate, bypass device, rudder, location of the counterweight can also be controlled by outside the pipeline. Solids 302 can be removed using devices well known in the art.

The sled can be assembled on site in the pipeline. The pipeline has a diameter to fit a person who can assemble the device. It can also be much greater. That is, to fit a bobcat or other mechanized device. The interrupter device 102 is typically formed of a plurality of components which are bolted together in any conventional manner. The members 104 can be hollow tubes with locations to access the interior of the tubes and bolt the combination together. The length of the tubes will vary according to the size of the pipeline. The interrupter device 102 is not intended to block the pipeline and may be used as a weir to relieve pressure or head in the device. The members or struts 108 would be used to connect the interrupter device with the platform, all of which are supported by the runners of the sled. The platform can comprise one or more parts. Usually, these components are all of a size to fit through a location from which the pipeline can be accessed, such as a manhole cover (not shown).

The foregoing description of the invention is thus illustrative and explanatory, and various changes in the equipment, as well as in the details of the methods and techniques disclosed herein may be made without departing from the spirit of the invention, which is defined by the claims.

What is claimed is:

1. A cleaning apparatus to be assembled in a conduit for cleaning a pipeline by increasing the flow rate of pipeline fluid, comprising:
   (A) a platform of a dimension sufficient to be inserted through an opening in said pipeline, said platform comprising one or more portions;
   (B) a fluid interrupter comprising one or more parts to provide a surface to contact fluid flow thereby interrupt fluid flow, the fluid interrupter constructed and arranged to be attached to the platform; a downstream side of the fluid interrupter being supported by members connected to the platform to dispose the fluid interrupter against fluid flow;
   (C) runners attached to the underside of the platform to contact an inner diameter of the pipeline; whereby the supported fluid interrupter, underside of the platform, and the runners form a channel through which fluid flows downstream; and
   (D) a device located at the downstream end of the said channel, the device arranged to constrict the volume of the fluid directed through the channel such that the flow rate is increased to move solid waste in the pipeline.

2. A cleaning apparatus according to claim 1, further comprising opposing support members on an upper face of said platform.

3. A cleaning apparatus according to claim 1, wherein the platform further comprises a rudder to orient disposition of the apparatus.

4. A cleaning apparatus according to claim 1, further comprising one or more ballasts disposed adjacent to one or more sides of the platform to correct any listing of the apparatus.

5. A cleaning apparatus according to claim 1, wherein the fluid interrupter comprises one or more seals or skirts that are disposed for lateral movement.

6. A cleaning apparatus according to claim 5, wherein the one or more seals or skirts are pneumatically moveable so as to move laterally from the centerline of the fluid interrupter.

7. A sled to be assembled in a pipeline of a dimension to permit assembly and with sufficient fluid flow to permit cleaning or movement of solid waste in a direction of fluid flow by increasing the rate of flow of fluid in the pipeline, said sled comprising:
   (A) a platform of a dimension to be inserted through an opening in a pipeline, said platform comprising a unitary construction;
   (B) attached to the upstream side of the unitary platform is a fluid interrupter; said fluid interrupter comprising multiple substantially parallel, essentially solid tubes attached to each other to form an essentially vertical surface upon which contacts the flow of fluid through the pipeline; the dimensions of the surface of the fluid interrupter being less than the diameter of the pipeline; the surface of the fluid interrupter being supported by members attached to it and the platform; the platform being displaced from the interior surface of the pipeline by runners; the platform, fluid interrupter, supports and runners forming a sled movable in the pipeline; the fluid interrupter being disposed to redirect fluid beneath the platform; the platform, runners and interior surface of the pipeline constricting movement of redirected fluid;
   (C) runners attached to the underside of the platform to contact an inner diameter of the pipeline; whereby the supported fluid interrupter, underside of the platform, and the runners form a channel through which fluid flows downstream; and
   (D) a device located at the downstream end of the said channel, the device arranged to constrict the volume of the fluid directed through the channel such that the flow rate is increased to move solid waste in the pipeline.

8. A sled according to claim 7, further comprising opposing support members on an upper face of said platform.

9. A sled according to claim 7, further comprising opposing support members on an upper face of said platform.

10. A sled according to claim 7, wherein the platform further comprises a rudder to orient disposition of the apparatus.

11. A sled according to claim 7, further comprising one or more ballasts disposed adjacent to one or more sides of the platform to correct any listing of the apparatus.

12. A sled according to claim 7, wherein the fluid interrupter comprises one or more seals or skirts that are disposed for lateral movement.

13. A sled according to claim 12, wherein the one or more seals or skirts are pneumatically moveable so as to move laterally from the centerline of the fluid interrupter.

* * * * *